(12) United States Patent
Datla et al.

(10) Patent No.: US 9,244,720 B2
(45) Date of Patent: Jan. 26, 2016

(54) AUTOMATED TECHNIQUE TO CONFIGURE AND PROVISION COMPONENTS OF A CONVERGED INFRASTRUCTURE

(71) Applicant: Cisco Technology, Inc., San Jose, CA (US)

(72) Inventors: Raju Datla, Pleasanton, CA (US); Raju S V L N Penmetsa, San Jose, CA (US); Muralidhara SrinivasaRao Alapati, Fremont, CA (US); Sung-Jin Lim, Fremont, CA (US); Bhaskar Krishnamsetty, Flower Mound, TX (US); Parthasarathy Venkatavaradhan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 14/020,023

(22) Filed: Sep. 6, 2013

(65) Prior Publication Data
US 2014/0109097 A1    Apr. 17, 2014

Related U.S. Application Data

(60) Provisional application No. 61/714,856, filed on Oct. 17, 2012.

(51) Int. Cl.
*G06F 9/46* (2006.01)
*G06F 9/50* (2006.01)

(52) U.S. Cl.
CPC ............... *G06F 9/46* (2013.01); *G06F 9/5061* (2013.01)

(58) Field of Classification Search
CPC ........ G06F 9/46; G06F 9/5061; G06F 3/0484
See application file for complete search history.

(56) References Cited

U.S. PATENT DOCUMENTS 7,219,140 B2 * 5/2007 Marl ................. H04L 29/08846
709/219
7,574,691 B2 * 8/2009 Freitas .................. G06F 9/4443
717/113

(Continued)

FOREIGN PATENT DOCUMENTS

WO    2014/022341 A1    2/2014

OTHER PUBLICATIONS

Agrawal et al. "Monitoring Infrastructure for Converged Networks and Services", 2007, 15 pages.*

(Continued)

*Primary Examiner* — Van Nguyen
(74) *Attorney, Agent, or Firm* — Edell, Shapiro & Finnan, LLC (57) ABSTRACT

A technique to provision a converted infrastructure (CI) includes generating task definitions to configure respective ones of compute, storage, and network components of a converged infrastructure (CI) when invoked. Each task definition includes a task identifier (ID), one or more component configuration commands, and one or more task arguments through which one or more corresponding component configuration parameters are passed to corresponding ones of the one or more component commands. The technique further includes automatically invoking each of the task definitions by task ID according to an ordered sequence in order to configure the CI. The automatically invoking includes providing the one or more component configuration commands and the corresponding one or more passed configuration parameters of each invoked task definition to the respective ones of the CI components.

18 Claims, 6 Drawing Sheets

(56) References Cited

U.S. PATENT DOCUMENTS

| | | | |
|---|---|---|---|
| 7,676,552 B2 * | 3/2010 | Eilam | G06F 9/5061 379/242 |
| 7,761,538 B2 * | 7/2010 | Lin | G06F 9/5061 709/220 |
| 8,910,176 B2 * | 12/2014 | Lindsay | G06F 9/5061 707/609 |
| 2003/0177412 A1 | 9/2003 | Todd | |
| 2006/0064619 A1 | 3/2006 | Wen et al. | |
| 2007/0168493 A1 | 7/2007 | Sarwono et al. | |
| 2012/0151036 A1 | 6/2012 | Detro et al. | |
| 2013/0036214 A1 | 2/2013 | Carmel et al. | |

OTHER PUBLICATIONS

Yu et al. "A Scheme for Improving Handover Feasibility in Convergence Networks", 2007, pp. 1521-1526.*

Ala et al. "Fast Convergence Mechanisms and Features Deployment Within Operator Backbone Infrastructures", 2009 IEEE, 5 pages.*

Scaramella, "HP Blade System Matrix: Delivering the Converged Infrastructure," IDC, White Paper, Jun. 2010, 11 pages.

UBM TechWeb, "Five Reasons to Make the Move to a Converged Infrastructure," A UBM TechWeb White Paper, Sep. 2012, 5 pages.

* cited by examiner

TASK DEFINITION 400

LABEL 404 — `<config-task-def id="netapp-disk-assign" category="Storage" label="Disk">`

ARGUMENTS 402:
- `<arg name="disk" type="string" mandatory="true" label="Disk"/>`
- `<arg name="owner" type="string" mandatory="true" label="Owner"/>`

`<config>`

CONFIGURATION SNIPPET 406:
```
<![CDATA[
    <disk-sanown-assign>
        <disk>$disk</disk>
        <owner>$owner</owner>
    <disk-sanown-assign>
]]>
```

`<config>`

`</config-task-def>`

TASK SEQUENCE  600

```
<task id="create-volume-1"
602
    ref="netapp-create-volume"

label="Create volume for Infrastructure vFiler">

</task>

<task-arg name="name" value="${volume_name}" />

604     <task-arg name="aggr" value="${aggregate_name}" />

<task-arg name="size" value="${volume_size_in_mb}m />

</task>

606
<task id="create-volume-2" ref="netapp-create-volume" label="Create volume for NFS Datastore">

<task-arg name="name" value="${volume_ds_name}" />

608     <task-arg name="aggr" value="${aggregate_name}" />

<task-arg name="size" value="${ds_volume_size_in_mb}m" />

</task>

620
<task id="enable-sis-I" ref="netapp-enable-sis" label="Enable sis" >

622 ──── <task-arg name="path" value="${path_name}" />

</task>
```

FIG.6

AUTOMATED TECHNIQUE TO CONFIGURE AND PROVISION COMPONENTS OF A CONVERGED INFRASTRUCTURE

CROSS-REFERENCE TO RELATED APPLICATION

This application claims the benefit of U.S. Provisional Application No. 61/714,856, filed Oct. 17, 2012, which is hereby incorporated by reference in its entirety.

TECHNICAL FIELD

The present disclosure relates to automated configuring of converged infrastructures.

BACKGROUND

A data center, cloud resource, or the like, may be implemented in the form of a converged infrastructure (CI). The CI is a set of integrated Information Technology (IT) components, such as storage, network, compute, and virtualization software and/or device components. The components of the CI must be initially configured, i.e., provisioned, prior to a first operational use of the CI. Commands to provision each component must conform to a vendor specification for the given component, i.e., the syntax and structure of such provisioning commands must follow different configuration data models defined by the different component vendors. Additionally, a user may be required to provide/input configuration information in a vendor-specific format to construct the provisioning commands that configure the corresponding vendor component. As a result of the vendor-specific nature of provisioning, conventional provisioning approaches typically use a collection of vendor-specific provisioning systems for the CI, each system to provision a corresponding one of the different vendor-specific components of the CI. The need for the different vendor-specific provisioning systems, and the need for the user to be aware of the different vendor-specific configuration inputs, add complexity to provisioning operations, unnecessarily burden the user, and generally make automated provisioning difficult to achieve.

DESCRIPTION OF EXAMPLE EMBODIMENTS

Overview

Techniques to provision a converged infrastructure (CI) are presented herein. One technique includes generating task definitions to configure respective ones of compute, storage, and network components of the converged infrastructure (CI) when invoked. Each task definition includes a task identifier (ID), one or more component configuration commands, and one or more task arguments through which one or more corresponding component configuration parameters are passed to corresponding ones of the one or more component commands. The technique also includes generating an ordered sequence of task identifiers (IDs) identifying corresponding ones of the task definitions that configure respective ones of the computer, storage and network components of the CI. The technique also includes automatically invoking each of the task definitions by task ID according to the ordered sequence in order to configure the CI. The automatically invoking operation includes providing the one or more component configuration commands and the corresponding one or more passed configuration parameters of each invoked task definition to the respective ones of the CI components.

Example Embodiments

A converged infrastructure (CI) is a modular, integrated, often pre-configured or at least easily configured, set of information technology (IT) components, typically including storage, network, compute, and virtualization components, that may be shared across multiple user applications that require storage, network, and compute resources. Due to the modular nature of the CI, the CI components made available to the user applications may be scaled up and down relatively easily and efficiently in order to accommodate corresponding increases and decreases in user application resource requirements. Examples of known converged infrastructures (CIs) include, but are not limited to, FlexPod™ by NetApp and Cisco, VSPEX by EMC, and Vblock™ by VCE. Such known CIs are configured and operated in accordance with respective vendor CI specifications that have become quasi-industry standards.

Figure 1:
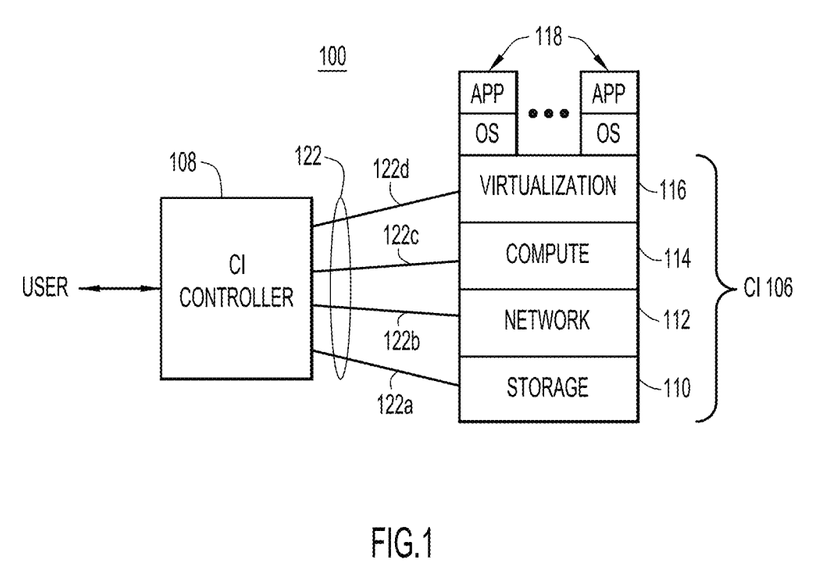
FIG. 1 is a block diagram of an example converged infrastructure environment in which a converged infrastructure (CI) is configured by and operates under control of a CI controller.

Referring first to FIG. 1, a block diagram of an example (CI) environment 100 is shown in which a CI 106 is configured by and operates under control of, a CI controller 108. CI 106 includes an integrated set of components, including a storage component 110 to provide data storage, a network component 112 to provide connectivity to external devices and communication networks, a compute or server component 114 to provide processing capacity to the CI, and a virtualization component 116, such as a hypervisor, to host virtual environments. Virtualization component 116 may host multiple virtual user operating environments 118 on the stack of CI components 110, 112, and 114. Virtual user operating environments 118 may each include a virtualized operating system (OS), and one or more applications (APs) executing in the virtualized OS. Components 110, 112, and 114 provide respective data storage, network, and compute resources required by each OS and the respective one or more APs.

At a high-level, CI controller 108 serves as a unified, automated, resource configured to manage CI 106. CI controller 108 includes one or more Graphical User Interfaces (GUIs) through which a user may issue commands and provide data to the CI controller to selectively cause the controller to perform general management operations with respect to CI 106, such as to provision, configure, validate, and monitor the CI. CI controller 108 manages CI 106 over a bi-directional communication interface 122, including component interfaces 122a, 122b, 122c, and 122d each to communicate directly with a respective one of storage, network, compute, and virtualization components 110, 112, 114, and 116. Component interfaces 122a-122d may support communications in accordance with any number of different protocols, including, for example, a network protocol such as the HyperText Transfer Protocol (HTTP). To the extent that components 110-116 of CI 106 support different interface protocols, such as a Rich Text or Extensible Markup Language (XML), component interfaces 122a-122d of CI controller 108 correspondingly support the different protocols, and the CI controller may be configured to communicate with components 110-116 using different protocols to maintain interface compatibility with the components as necessary.

CI controller 108 performs the provision/configure operations in a pre-operational and/or a pre-deployment phase of CI 106 to set-up/establish storage, network, compute, and virtualization components 110, 112, 114, and 116 in accordance with storage, network, compute, and virtual resource requirements of an intended operational environment. The provision operation may be considered an initial configure operation to configure the components of the CI for useful operation after the components have been unpacked and powered ON for the first time. Therefore, the terms "provision" and "configure" and their various forms are used interchangeably herein. Exemplary provision operations may establish storage volumes or partitions on storage component 110, establish virtual local area network (vlan) pools on network component 112, assign computing blades on compute component 114, and establish virtual resource pools on virtualization component 116.

As will be described in detail below, the provision operations include initial, a priori operations to generate (i) task definitions that provision the components of CI 106 when the task definitions are invoked, and (ii) a script or ordered sequence that prescribes an order in which at least some of the generated task definitions are invoked to achieve a specific provisioning goal. Provision operations also include subsequent, automated operations to automatically provision the components of CI 106 based on the a priori defined task definitions and the script, i.e., to automatically invoke the task definitions listed in the script. After CI 106 has been provisioned, then the CI may be operated in the intended operational environment. In the operational environment, the monitor operation is performed with respect to CI 106 while the CI is operating, i.e., during run-time. The validate operation may span both the initial pre-deployment and the run-time phases.

Figure 2:
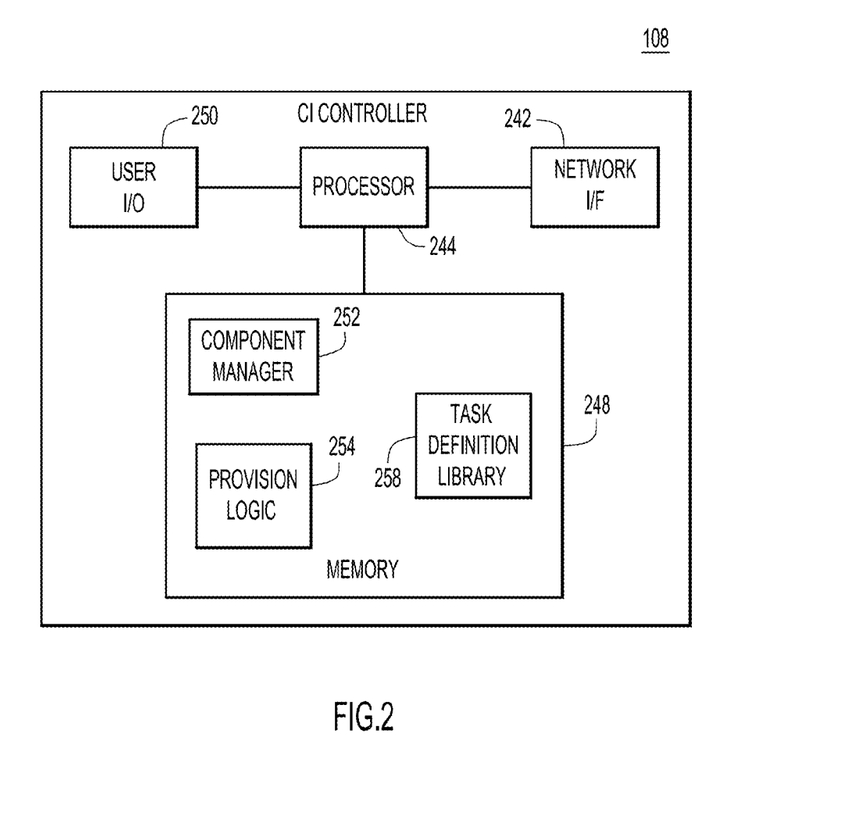
FIG. 2 is a block diagram of an example CI controller configured to perform management operations related to the CI from FIG. 1.

Reference is now made to FIG. 2, which shows an example block diagram of CI controller 108 configured to perform the management operations described herein, and particularly, the operation to provision CI 106. As mentioned above, the provision operations include a priori operations to generate task definitions and a script of task definitions, and subsequent automated operations to automatically invoke the scripted task definitions. There are numerous possible configurations for CI controller 108 and FIG. 2 is meant to be an example. CI controller 108 includes a network interface unit 242, a processor 244, memory 248, and a user Input/Output module 250 used in association with the one or more GUIs to enable the user to interface with the CI controller. The network interface (I/F) unit 242 is, for example, an Ethernet card device that allows the CI controller 108 to communicate over a network, e.g., a wired (Ethernet) network. Network I/F 242 may also include wireless connection capability. Interface 122 (from FIG. 1) may be implemented through network I/F unit 242. The processor 244 is a microcontroller or microprocessor, for example, configured to execute software instructions stored in the memory 248.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for Component Manager Logic 252 to perform the generalized management operations mentioned above, Provision Logic 254 to perform or assist with performing the provision operations mentioned above. In addition, the memory 248 stores task definitions in a library 258 along with one or more generated scripts of task definitions. GUI logic may be divided among logic units 252, 254, and 256 as necessary to support the respective logic operations.

Figure 3:
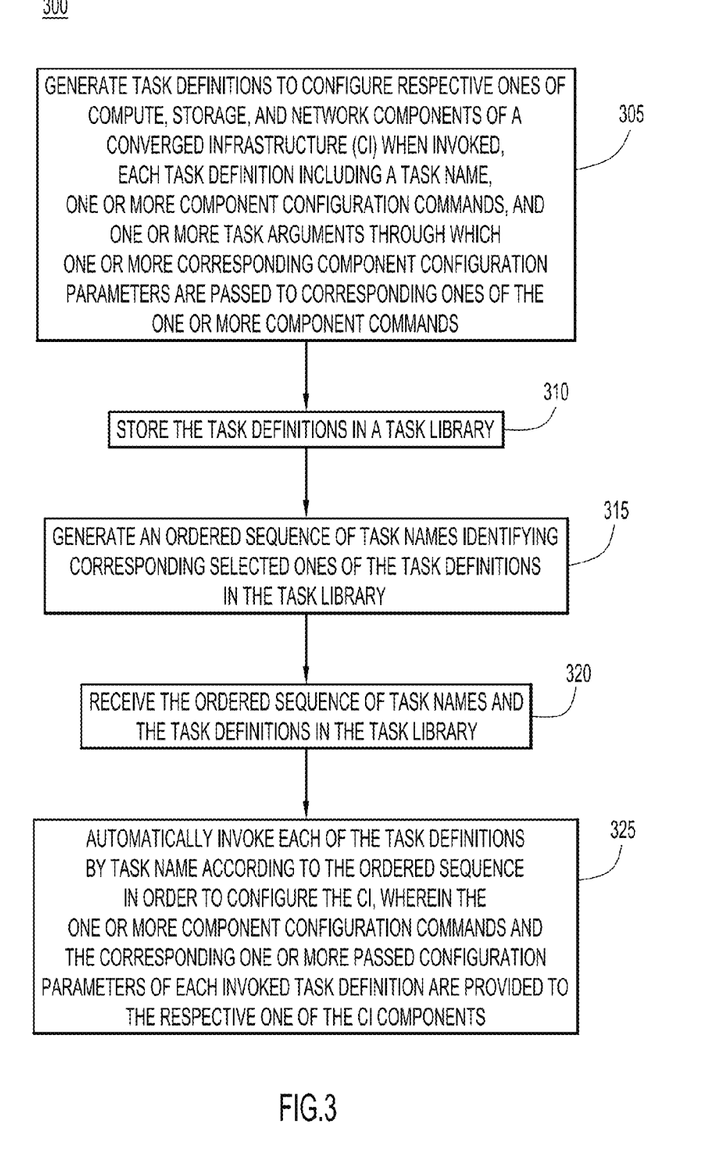
FIG. 3 is a flowchart that depicts example high-level operations to provision the CI of FIG. 1.

FIG. 3 is a flowchart that depicts example high-level operations 300 to provision CI 106. Operations 300 may be performed by Provision Logic 254 in cooperation with the user/operator of CI controller 108. Operations 305-315 are initial a priori provision operations to generate task definitions and a script that are performed before subsequent automated provision operations 320 and 325 are performed.

At 305, task definitions are generated to configure respective ones of the compute, storage, network, and virtualization components of CI 106. The task definitions provision respective ones of CI components 110-116 when the task definitions are invoked. Each task definition includes a task identifier (ID) or name, a set of one or more component configuration commands, and a set of one or more task arguments through which one or more corresponding component configuration parameters are passed to corresponding ones of the one or more component commands if and when the component commands are invoked. Task definitions may be generated in any number of different formats including, but not limited to, plain text, Extensible Markup Language (XML), JavaScript Object Notation (JSON), and so on.

The user may generate the task definitions in cooperation with logic 254. For example, logic 254 may solicit and receive provision information related to each of components 110-116 from the user through a GUI associated with logic 254. The component configuration commands of each task definition conform to a vendor command specification for the respective component that is to be configured by the commands. For example, the syntax and structure of each command may follow a vendor defined configuration data model for the component to be configured. The vendor model may be highly structured, or alternatively, relatively unstructured. Because each command is formatted according to the corresponding vendor defined configuration model, the command is capable of being interpreted or understood by the respective component when the command is provided to the component. In contrast, the corresponding task ID is a functional, vendor-independent (i.e., abstracted), alpha-numeric ID that is easily understood by the user. Thus, the task ID is abstracted from the vendor command specification to a higher level that is understandable to a person.

At 310, logic 254 stores the task definitions generated at 305 in library 258 so as to be accessible to logic 254 in subsequent operations described below.

At 315, a script or ordered sequence of task IDs identifying corresponding ones of the task definitions to achieve a specific provisioning goal on CI 106 is generated. The task IDs may identify task definitions that configure respective ones of the computer, storage, network and virtualization components of the CI. The script may be considered a list of "calls"

to the identified task definitions. The script may be generated in any number of different formats including, but not limited to, plain text, Extensible Markup Language (XML), JavaScript Object Notation (JSON), and so on. To generate the script, the user may select various task definitions among the task definitions in library 258 by task ID and list the selected task IDs in a desired order in the script. With each task ID, the user may also enter corresponding configuration parameters needed by the commands of the task definition identified by the ID. The user may generate the script in cooperation with logic 254, which may solicit and receive task IDs and corresponding configuration parameters from the user as script entries. Logic 254 may store the script in memory 248, e.g., in library 258.

At 320, the task definitions in the library and script are received as inputs for use by subsequent automated operation 325. Thus, at 320, logic 254 receives the script from 315 and obtains access to the task definitions in library 258.

At 325, logic 254 automatically invokes, i.e., calls, each of the task definitions by task ID according to the ordered sequence (script) in order to configure CI 106. In this operation, Logic 254 provides the one or more component configuration commands and the corresponding one or more passed configuration parameters of each invoked task definition to the respective one of the CI components. As a result, the CI components perform configure operations based on or responsive to the received configuration commands and the passed configuration parameters. Operation 325 will be described in further detail below in connection with FIGS. 4 and 5.

Figure 4:
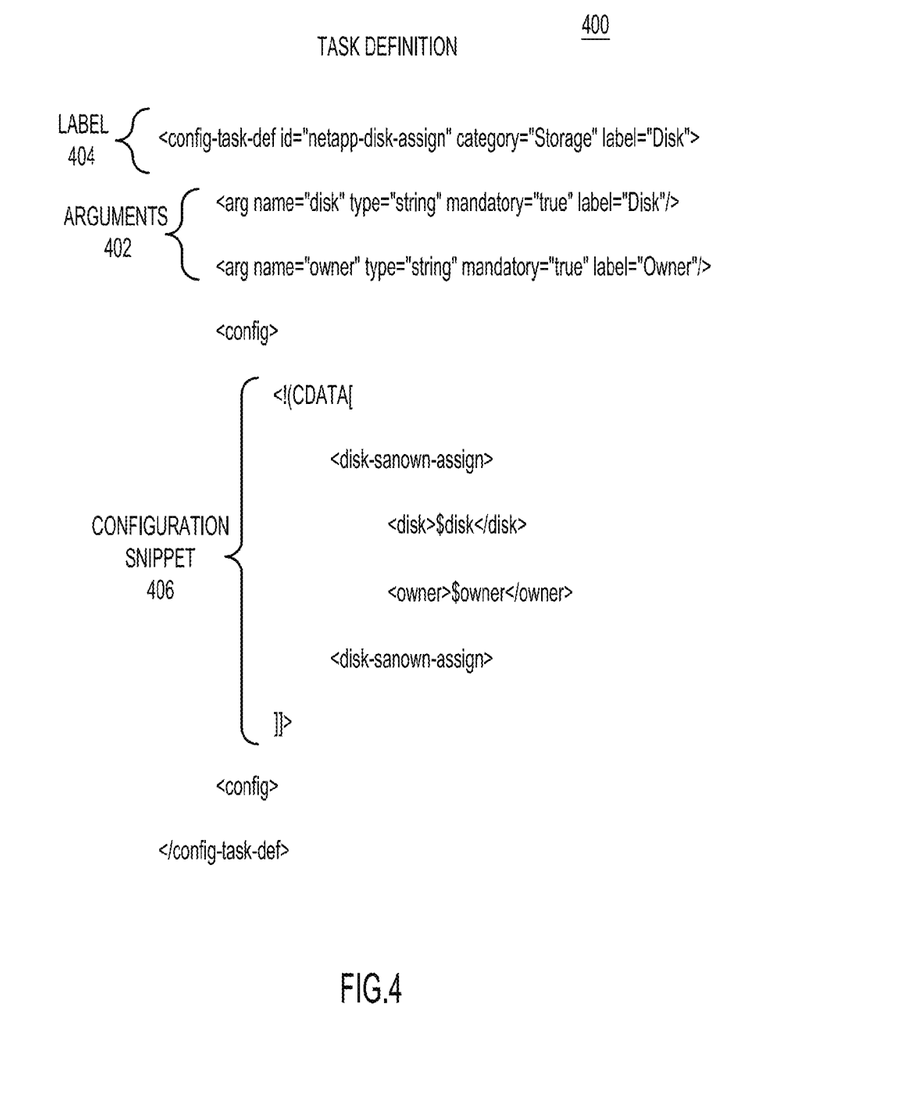
FIG. 4 is an example task definition that configures a storage component of the CI of FIG. 1.

With reference to FIG. 4, there is depicted an example task definition 400 to perform a configure operation on storage component 110 of CI 106, namely to make an owner assignment to a disk. Other task definitions may be constructed with a similar overall framework, i.e., structure and syntax, as task definition 400 in order to perform additional configure operations on storage component 110, or to perform configure operations on the compute, network, and virtualization components of CI 106. With respect to method 300 depicted in FIG. 3, task definition 400 may be one of the task definitions generated at operation 305, included in a script at operation 315, and then activated or invoked at operation 325 to perform the prescribed configure operation on storage component 110. Typically, multiple such task definitions will be generated, scripted, and then invoked to provision/configure each of the components 110-116 of CI 106.

Task definition 400 includes a high-level label section 402, an argument section 404, and a configuration snippet 406. Label section 402 identifies task definition 400 at an easy to understand, functional level. In the example of FIG. 4, label section 402 includes an alphanumeric task ID "netapp-disk-assign" to identify the task definition functionally, a component category "Storage" to identify the CI component (namely, storage) to be configured functionally, and a label "Disk." Other possible component categories corresponding to the other CI components include "Compute," "Network," and "Virtualization" categories.

Argument section 404 includes definitions, i.e., names and corresponding type descriptors, of one or more configuration parameters to be received by configuration task 400 when it is invoked. The received configuration parameters are passed to configuration snippet 406. In the example of FIG. 4, argument section 404 defines two arguments corresponding to two configuration parameters to be received and passed to configuration snippet 406. The two arguments include (i) "disk" of type "string," and (ii) "owner" also of type "string."

Configuration snippet 406 includes a configuration command "disk-sanown-assign." The configuration command "disk-sanown-assign" performs a configure operation, namely, disk ownership assignment, on target storage component 110, when task definition 400 is invoked. When task definition 400 is invoked, the following operations occur. First, configuration parameters "$Disk" and "$Owner" are received through argument section 404 and passed to the configuration command "disk-sanown-assign" of configuration snippet 406. Then, the configuration command "disk-sanown-assign" along with the passed parameters "$Disk" and "$Owner" are pushed, i.e., provided, to target storage component 110 to perform the disk assignment operation on the storage component. The operations just described with respect to task definition 400 are understood to extend generally to other task definitions that may be constructed and invoked in accordance with the techniques described herein to configure all of the components 110-116 of CI 106.

An advantage of task definition 400 is that the low-level commands of configuration snippet 406 are encapsulated and thus essentially hidden from the user, while the user is exposed only to the high-level task ID in label 402 and the high-level configuration parameter names corresponding to arguments section 404. Assuming this approach across all other task definitions in library 258, the user is able to construct scripts to provision CI 106 from easy to understand functional task IDs that are vendor independent, without having to be familiar with the low-level configuration commands that are vendor dependent.

Figure 5:
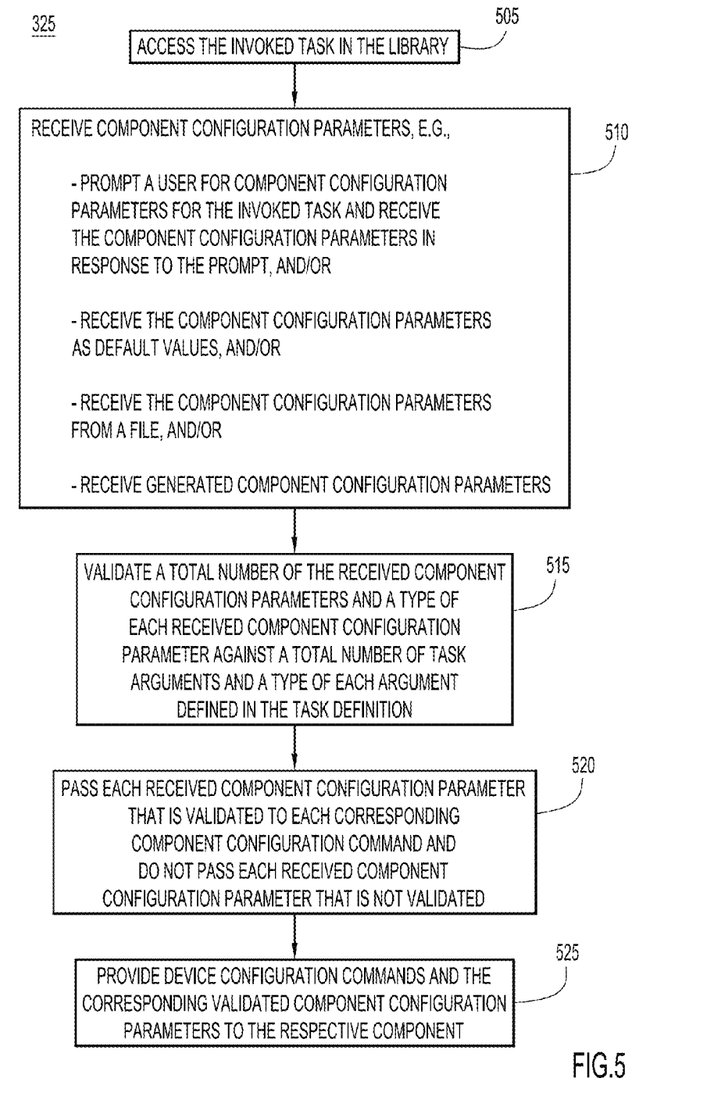
FIG. 5 depicts operations expanding on an operation from the flowchart of FIG. 3 to automatically invoke task definitions from a script.

FIG. 5 shows operations 505-525 expanding on operation 325 performed by logic 254 to automatically invoke task definitions from a script. The operations of FIG. 5 are performed for each invoked task definition, and are described also with reference to example task definition 400 in FIG. 4.

At 505, logic 254 accesses the invoked task in library 258. In the example of FIG. 4, invoked task definition 400 is accessed.

At 510, logic 254 receives component configuration parameters corresponding to arguments defined in the task definition. In the example of FIG. 4, parameters "$disk" and "owner" are received. The configuration parameters may be received in a number of ways. For example, logic 254 may prompt the user for the component configuration for the invoked task and receive the component configuration parameters in response to the prompt. The configuration parameters may be received as default values. The configuration may be read from an input file prepared prior to operation 510. Alternatively, the configuration parameters may be calculated at operation 510.

At 515, logic 254 validates a total number of the received component configuration parameters and a type of each received component configuration parameter against a total number of task arguments and a type of each argument defined in the arguments section of the task definition. In the example of FIG. 4, logic 254 validates that a total number of two parameters were received and that both types were of type "string" corresponding to the two parameters "$disk" and "owner," as defined in arguments section 404.

At 520, logic 254 passes each received component configuration parameter that is validated to each corresponding component configuration command in a configuration snippet of the invoked task definition, and does not pass each received component configuration parameter that is not validated. In the example of FIG. 4, assuming validation, parameters "$disk" and "owner" are passed to the command "disk-sanown-assign" in configuration snippet 406.

The above described operations to receive, validate, and pass the configuration parameters to the commands of the configuration snippet collectively represent a process referred to as "parameter binding" the configuration parameters to the commands. Essentially, parameter binding is the process by which received configuration parameters are associated with the commands of the appropriate one of the task definitions to which they pertain. Logic 254 may include Dynamic Declarative Parameterized (DDP) logic to perform parameter binding. The DDP logic may use parameterized maps each to map received configuration parameters to the appropriate one of the invoked task definitions.

At 525, logic 254 provides the device configuration commands and the corresponding validated component configuration parameters to the respective component. In the example of FIG. 4, command "disk-sanown-assign" and parameters "$disk" and "owner" are provided to storage component 110 to configure the component.

Figure 6:
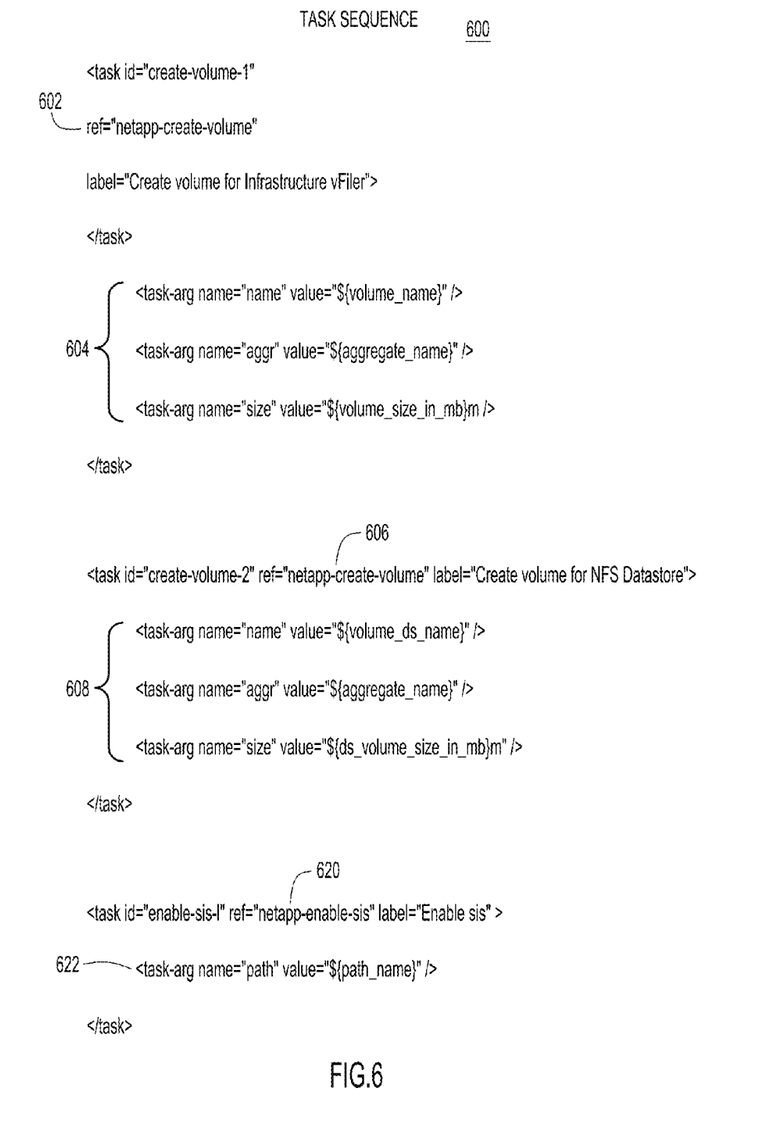
FIG. 6 is an example script of task identifiers of task definitions to create volumes on the storage component of the CI from FIG. 1.

FIG. 6 is an example script 600 of task IDs of task definitions to achieve specific configure operations on storage component 110 of CI 106, namely to create a volume 1 and a volume 2 on storage component 110. Script 600 may be created by a user as an input file and read by logic 254, e.g., at operation 320 in FIG. 3.

Script 600 references a first call 602 to a task definition identified as "netapp-create-volume" to create a volume 1 on storage component 110. The call receives a first set of parameters 604 "${volume_name}," "${aggregate_name}," and "{volume_size_in_mb}." When invoked at call 602, the task identified as "netapp-create-volume" will create volume 1 on storage component 110 based on the parameters 604.

Script 600 references a subsequent, second call 606 to the task definition identified as "netapp-create-volume" to create a volume 2 on storage component 110. The call receives a second set of parameters 608 "${volume_ds_name}," "${aggregate_name}," and "{volume_size_in_mb}." When invoked the second time at call 606, the task identified as "netapp-create-volume" will create volume 2 on storage component 110 based on the parameters 608. In this way, the task definition identified as "netapp-create-volume" may be reused in succession with different parameters to configure different aspects of storage component 110.

Script 600 includes a subsequent call 620 to a task definition identified as "netapp-enable-sis," which accepts a single parameter 622 to further configure storage component 110.

From the above, it is apparent that a script may call the same task definition multiple times with different configuration parameters to achieve different configuration goals.

Also, scripts may be generated based on the techniques described herein to configure all of the components 110-116 of CI 106 (FIG. 1). For example, assume the task definitions include: a compute component task definition including a compute component command and a corresponding compute task argument to assign a server blade among a pool of server blades on compute component 114; a storage task definition including a storage component command and a corresponding storage task argument to create a storage volume on storage component 110; and a network task definition including a network component command and a corresponding network task argument to establish a network pool and address range on network component 112. Then a script may be generated to call the compute, storage, and network task definitions to configure the storage, network, and compute components, respectively.

As described herein, a technique is provided to generate (i) task definitions that configure respective ones of storage, compute, network, and virtualization components of a CI, and (ii) a script identifying task definition by task ID. The technique uses a CI controller to automatically invoke each of the task definitions identified in the script in order to configure the respective CI components. Using the technique, a single CI controller may automatically configure all components of the CI in a provisioning environment, thus obviating the need for multiple vendor specific systems to configure the multiple vendor specific components of the CI. Also, the task definitions are identified by easy to understand names/identifiers so that a user/operator of the CI controller can generate the task definitions and script without having to be aware of low level, vendor specific component configuration commands.

In summary, in one form, a method is provided comprising: generating task definitions to configure respective ones of compute, storage, and network components of a converged infrastructure (CI) when invoked, each task definition including a task identifier (ID), one or more component configuration commands, and one or more task arguments through which one or more corresponding component configuration parameters are passed to corresponding ones of the one or more component commands; generating an ordered sequence of task identifiers (IDs) identifying corresponding ones of the task definitions that configure respective ones of the computer, storage and network components of the CI; and automatically invoking each of the task definitions by task ID according to the ordered sequence in order to configure the CI, wherein the automatically invoking includes providing the one or more component configuration commands and the corresponding one or more passed configuration parameters of each invoked task definition to the respective ones of the CI components.

In another form, an apparatus is provided comprising: a network interface unit configured to send and receive communications over a network; and a processor coupled to the network interface unit, and configured to: receive an ordered sequence of task identifiers (IDs) identifying corresponding task definitions, the task definitions to configure respective ones of compute, storage, and network components of a converged infrastructure (CI) when invoked, each task definition including a task identifier (ID), one or more component configuration commands, and one or more task arguments through which one or more corresponding component configuration parameters are passed to corresponding ones of the one or more component commands; and invoke each of the task definitions by task ID according to the sequence so as to configure the CI, wherein the processor configured to invoke is further configured to provide the one or more component configuration commands and the corresponding one or more passed configuration parameters of each invoked task definition to the respective one of the CI components.

In still another form, a processor readable medium is provided for storing instructions that, when executed by a processor, cause the processor to: receive an ordered sequence of task identifiers (IDs) identifying corresponding task definitions, the task definitions to configure respective ones of compute, storage, and network components of a converged infrastructure (CI) when invoked, each task definition including a task identifier (ID), one or more component configuration commands, and one or more task arguments through which one or more corresponding component configuration parameters are passed to corresponding ones of the one or more component commands; and invoke each of the task definitions by task ID according to the ordered sequence so as to configure the CI, wherein the processor configured to invoke is further configured to provide the one or more component configuration commands and the corresponding one or more passed configuration parameters of each invoked task definition to the respective one of the CI components.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   generating task definitions to configure respective ones of compute, storage, and network components of a converged infrastructure (CI) when invoked, each task definition including a task identifier (ID), one or more component configuration commands, and one or more task arguments through which one or more corresponding component configuration parameters are passed to corresponding ones of the one or more component commands;
   generating an ordered sequence of task identifiers (IDs) identifying corresponding ones of the task definitions that configure respective ones of the computer, storage and network components of the CI; and
   automatically invoking each of the task definitions by task ID according to the ordered sequence in order to configure the CI, wherein the automatically invoking includes providing the one or more component configuration commands and the corresponding one or more passed configuration parameters of each invoked task definition to the respective ones of the CI components, and wherein the automatically invoking further includes, for each invoked task definition:
      receiving each component configuration parameter through the corresponding task argument;
      validating a total number of the received component configuration parameters and a type of each received component configuration parameter against a total number of task arguments and a type of each argument defined in the task definition; and
      passing each received component configuration parameter that is validated to each corresponding component configuration command and not passing each received component configuration parameter that is not validated.

2. The method of claim 1, further comprising storing the task definitions in a library, wherein the generating the ordered sequence includes:
   selecting the task definitions from the library; and
   generating the ordered sequence based on the selected task definitions,
   wherein the automatically invoking includes accessing in the library each task definition identified in the ordered sequence.

3. The method of claim 1, wherein the automatically invoking further includes for each invoked task definition:
   prompting a user to enter each component configuration parameter through a graphical user interface (GUI),
   wherein the receiving each component configuration parameter includes receiving each component configuration parameter entered by the user in response to the prompting.

4. The method of claim 1, wherein the generating further includes:
   generating a compute component task definition including a compute component command and a corresponding compute task argument to assign a server blade among a pool of server blades to the CI;
   generating a storage task definition including a storage component command and a corresponding storage task argument to create a storage volume on the storage component; and
   generating a network task definition including a network component command and a corresponding network task argument to establish a network address range for the network component; and
   the automatically invoking further includes providing the compute, the storage, and the network component commands and corresponding passed component configuration parameters to the storage, network, and compute components, respectively.

5. The method of claim 1, wherein the generating further includes generating a task definition to configure a virtualization component of the converged infrastructure (CI).

6. The method of claim 1, wherein each component configuration command of each task definition conforms to a vendor command specification for the respective component, and the corresponding task ID is a functional, vendor-independent, alpha-numeric ID.

7. An apparatus comprising:
   a network interface unit configured to send and receive communications over a network; and
   a processor coupled to the network interface unit, and configured to:
      receive an ordered sequence of task identifiers (IDs) identifying corresponding task definitions, the task definitions to configure respective ones of compute, storage, and network components of a converged infrastructure (CI) when invoked, each task definition including a task identifier (ID), one or more component configuration commands, and one or more task arguments through which one or more corresponding component configuration parameters are passed to corresponding ones of the one or more component commands; and
      invoke each of the task definitions by task ID according to the sequence so as to configure the CI, wherein the processor configured to invoke is further configured to provide the one or more component configuration commands and the corresponding one or more passed configuration parameters of each invoked task definition to the respective one of the CI components, and wherein the processor is further configured to, for each invoked task definition:
         receive each component configuration parameter through the corresponding task argument;
         validate a total number of the received component configuration parameters and a type of each received component configuration parameter against a total number of task arguments and a type of each argument defined in the task definition; and
         pass each received component configuration parameter that is validated to each corresponding component configuration command and do not pass each received component configuration parameter that is not validated.

8. The apparatus of claim 7, further comprising a memory to store the task definitions, wherein the processor configured to invoke is further configured to access each invoked task definition in the memory.

9. The apparatus of claim 7, wherein the processor is further configured to, for each invoked task definition:
prompt a user to enter each component configuration parameter through a graphical user interface (GUI),
wherein the processor configured to receive each component configuration parameter is further configured to receive each component configuration parameter entered by the user in response to the prompt.

10. The apparatus of claim 7, wherein the task definitions include:
a compute component task definition including a compute component command and a corresponding compute task argument to assign a server blade among a pool of server blades to the CI;
a storage task definition including a storage component command and a corresponding storage task argument to create a storage volume on the storage component; and
a network task definition including a network component command and a corresponding network task argument to establish a network address range for the network component; and
the processor is further configured to provide the compute, the storage, and the network component commands and corresponding passed component configuration parameters to the storage, network, and compute components, respectively.

11. The apparatus of claim 7, wherein the task definitions further include a task definition to configure a virtualization component of the converged infrastructure (CI).

12. The apparatus of claim 7, wherein each component configuration command of each task definition conforms to a vendor command specification for the respective component, and the corresponding task ID is a vendor-independent, alpha-numeric descriptor.

13. A non-transitory processor readable medium storing instructions that, when executed by a processor, cause the processor to:
receive an ordered sequence of task identifiers (IDs) identifying corresponding task definitions, the task definitions to configure respective ones of compute, storage, and network components of a converged infrastructure (CI) when invoked, each task definition including a task identifier (ID), one or more component configuration commands, and one or more task arguments through which one or more corresponding component configuration parameters are passed to corresponding ones of the one or more component commands; and
invoke each of the task definitions by task ID according to the ordered sequence so as to configure the CI, wherein the processor configured to invoke is further configured to provide the one or more component configuration commands and the corresponding one or more passed configuration parameters of each invoked task definition to the respective one of the CI components, wherein the instructions to cause the processor to invoke include instructions to cause the processor to, for each invoked task definition:
receive each component configuration parameter through the corresponding task argument;
validate a total number of the received component configuration parameters and a type of each received component configuration parameter against a total number of task arguments and a type of each argument defined in the task definition; and
pass each received component configuration parameter that is validated to each corresponding component configuration command and do not pass each received component configuration parameter that is not validated.

14. The processor readable medium of claim 13, wherein:
the task definitions identified in the ordered sequence are stored in a memory; and
the instructions to cause the processor to invoke include instructions to cause the processor to access each invoked task definition in the memory.

15. The processor readable medium of claim 13, the instructions to cause the processor to invoke include instructions to cause the processor to, for each invoked task definition:
prompt a user to enter each component configuration parameter through a graphical user interface (GUI),
wherein the instructions to cause the processor to receive each component configuration parameter include instructions to cause the processor to receive each component configuration parameter entered by the user in response to the prompt.

16. The processor readable medium of claim 13, wherein: the task definitions include:
a compute component task definition including a compute component command and a corresponding compute task argument to assign a server blade among a pool of server blades to the CI;
a storage task definition including a storage component command and a corresponding storage task argument to create a storage volume on the storage component; and
a network task definition including a network component command and a corresponding network task argument to establish a network address range for the network component; and
the instructions to cause the processor to invoke include instructions to cause the processor to provide the compute, the storage, and the network component commands and corresponding passed component configuration parameters to the storage, network, and compute components, respectively.

17. The processor readable medium of claim 13, wherein the instructions to cause the processor to receive task definitions include further instructions to cause the processor to receive a task definition to configure a virtualization component of the converged infrastructure (CI).

18. The processor readable medium of claim 13, wherein each component configuration command of each task definition conforms to a vendor command specification for the respective component, and the corresponding task ID is a is a functional, vendor-independent, alpha-numeric ID.

* * * * *